(12) United States Patent
Singh et al.

(10) Patent No.: US 8,538,403 B2
(45) Date of Patent: *Sep. 17, 2013

(54) METHOD AND APPARATUS FOR DISAMBIGUATING AN EMERGENCY CALL ATTEMPT DURING PASSWORD ENTRY FOR UNLOCKING A MOBILE DEVICE

(75) Inventors: Ravi Singh, Waterloo (CA); Kristof Takacs, Waterloo (CA); Neil Patrick Adams, Waterloo (CA)

(73) Assignee: Blackberry Limited, Waterloo (CA)

( * ) Notice: Subject to any disclaimer, the term of this patent is extended or adjusted under 35 U.S.C. 154(b) by 0 days.

This patent is subject to a terminal disclaimer.

(21) Appl. No.: 13/548,474

(22) Filed: Jul. 13, 2012

(65) Prior Publication Data

US 2012/0282880 A1 Nov. 8, 2012

Related U.S. Application Data

(63) Continuation of application No. 12/570,844, filed on Sep. 30, 2009, now Pat. No. 8,244,231.

(51) Int. Cl.
*H03K 17/94* (2006.01)
*H03M 11/00* (2006.01)
*H04M 11/04* (2006.01)
*H04M 1/66* (2006.01)
*H04M 1/68* (2006.01)
*H04M 3/16* (2006.01)
*H04M 1/00* (2006.01)
*H04B 1/38* (2006.01)

(52) U.S. Cl.
USPC ........ 455/418; 455/404.1; 455/411; 455/565; 341/22

(58) Field of Classification Search
USPC ............... 379/216.01, 355.01; 455/404.1, 455/410, 411, 418, 565
See application file for complete search history.

(56) References Cited

U.S. PATENT DOCUMENTS

| | | | | |
|---|---|---|---|---|
| 5,499,288 | A * | 3/1996 | Hunt et al. | 379/88.02 |
| 6,574,484 | B1 * | 6/2003 | Carley | 455/521 |
| 7,159,232 | B1 * | 1/2007 | Blackketter et al. | 725/38 |
| 2002/0133565 | A1 * | 9/2002 | Huat | 709/218 |
| 2006/0025110 | A1 * | 2/2006 | Liu | 455/411 |

OTHER PUBLICATIONS

BlackBerry 8310 Smartphone User Guide, phone first marketed in Oct. 2007.*
CrackBerry Forums from Jan.-Mar. 2008 at http://forums.crackberry.com/blackberry-pearl-81xx-f79/phone-locked-how-disable-emergency-call-15398/.*

(Continued)

*Primary Examiner* — Dwayne Bost
*Assistant Examiner* — Larry Sternbane
(74) *Attorney, Agent, or Firm* — Perry + Currier

(57) ABSTRACT

A method and apparatus for unlocking a mobile communication device are provided, the mobile communication device comprising an input device, and a display device, the mobile communication device enabled to initiate emergency calls in a locked state. Password input data is received via the input device, when the mobile communication device is in the locked state, the password input data for unlocking the mobile communication device, the password input data comprising at least a sequence of characters for initiating an emergency call. In response to receiving the sequence of characters for initiating the emergency call, the display device is controlled to provide a representation of instructions to initiate the emergency call upon receipt of emergency call initiate data from the input device.

17 Claims, 7 Drawing Sheets

(56) References Cited

OTHER PUBLICATIONS

RIM Press Release "BlackBerry Curve 8310 Smartphone Now Available Through Vodacom" Sep. 2007.*

Pogue, David, "iPhone Keyboard Secrets" New York Times, Jun. 27, 2007.*

U.S. Appl. No. 12/570,844, filed Sep. 30, 2009 entitled "Method and Apparatus for Unlocking a Communication Device".

* cited by examiner

METHOD AND APPARATUS FOR DISAMBIGUATING AN EMERGENCY CALL ATTEMPT DURING PASSWORD ENTRY FOR UNLOCKING A MOBILE DEVICE

CROSS-REFERENCE TO RELATED APPLICATION(S)

This application is a continuation of U.S. application Ser. No. 12/570,844 filed Sep. 30, 2009, and issued as U.S. Pat. No. 8,244,231 on Aug. 14, 2012, the contents of which are incorporated herein by reference.

FIELD

The specification relates generally to communication devices, and specifically to a method, apparatus for unlocking a mobile communication device.

BACKGROUND

Mobile communication device often require input of character sequences, including device passwords, smart card PINs, SIM pins and the like, via an input dialog box provided at the display device from a lock screen. Many mobile communication devices are also enabled to allow emergency calls, such as 911 calls, from the lock screen. Indeed, in some jurisdictions, such functionality is legislated, in that character input such 911, 999, 112, 008, etc. causes an emergency call to be placed and/or to bring up an emergency call dialog box. Moreover, different keyboards map these numbers to different letters, and input of the mapped characters can also cause the emergency call to be placed: for example 911 can be mapped to "cww", and determination of receipt of "cww" triggers the 911 call and/or the emergency call dialog. Hence, if character sequences contain emergency number sequences, then the emergency call dialog box will appear in front of the input dialog box asking that the "Send" button be pressed to make the emergency call. The emergency call dialog box must then be dismissed, for example by pressing any button other then the "Send" button to dismiss the dialog before the remainder of the password is received and/or access is granted to the device. Such a situation can force use of passwords that do not contain emergency character sequences, but also is a general waste of processing resources as the communication device is unnecessarily placed in an emergency call ready mode and/or wastes computing resources to provide the emergency call dialog box and/or causes an erroneous emergency call to be placed. The latter is a further waste of bandwidth, as well as a waste of resources at an emergency call centre as the erroneous call is received and processed, for example by a call centre management system. Such a call can also result in a delayed response to legitimate emergency calls.

BRIEF DESCRIPTIONS OF THE DRAWINGS

Embodiments are described with reference to the following figures, in which.

DETAILED DESCRIPTION OF THE EMBODIMENTS

Figure 1:
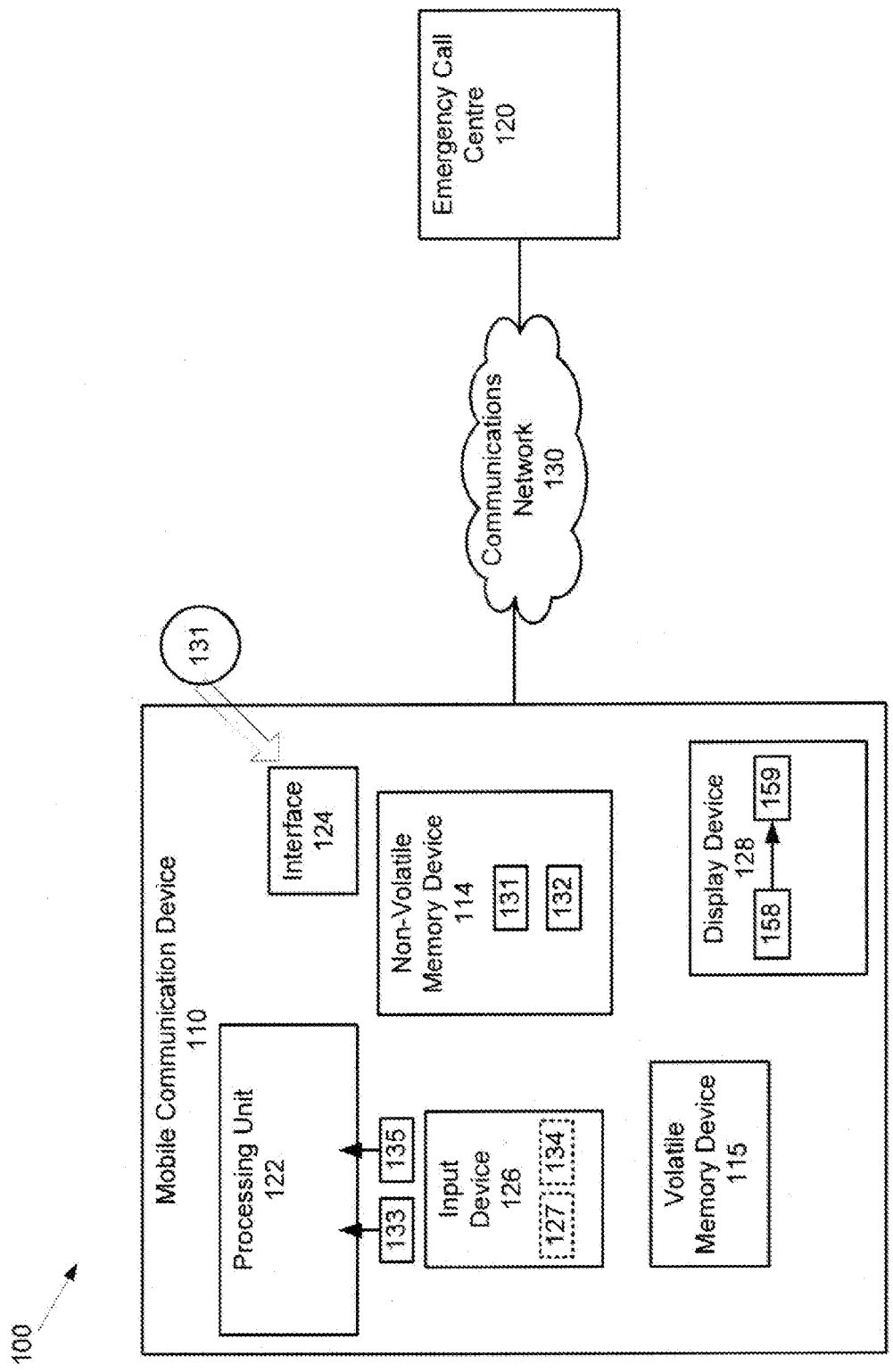
FIG. 1 depicts schematic diagram of a system for unlocking a mobile communication device, according to non-limiting embodiments.

A first aspect of the specification provides a method for distinguishing between password entry and emergency call initiation at a mobile communication device comprising an input device, and a display device, the mobile communication device enabled to initiate emergency calls in a locked state. The method comprises receiving password input data via the input device, when the mobile communication device is in the locked state, the password input data for unlocking the mobile communication device, the password input data comprising at least a sequence of characters for initiating an emergency call. The method further comprises, in response to receiving the sequence of characters for initiating the emergency call, controlling the display device to provide a representation of instructions to initiate the emergency call upon receipt of emergency call initiate data from the input device.

The method can further comprise placing the mobile communication device in an unlocked state if the password input data matches stored password data. The method can further comprise placing the mobile communication device back in the locked state after a pre-determined period of time.

The method can further comprise receiving the emergency call initiate data and initiating the emergency call.

The method can further comprise controlling the display device to remove the representation of instructions to initiate the emergency call if the emergency call initiate data is not received within a given time period.

The method can further comprise controlling the display device to remove the representation of instructions to initiate the emergency call if a next input in the password input data received from the input device, following the sequence of characters for initiating the emergency call, is any input other than the emergency call initiate data. The next input can comprise a character in the password input data.

The password input data can be received within a password dialog box and the representation of instructions to initiate the emergency call upon receipt of the emergency call initiate data may not obscure the password dialog box on the display device.

The input device can comprise a call send key such that the emergency call initiate data can be received via the call send key.

The input device can comprise a voice recognition input device.

A second aspect of the specification provides a mobile communication device configured for access when in a locked state. The mobile communication device comprises a processing unit interconnected with a communication interface, an input device, a display device and a memory device. The processing unit is enabled to initiate emergency calls in the locked state via the communication interface. The processing unit is further enabled to receive password input data via the input device, when the mobile communication device is in the locked state, the password input data for unlocking the mobile communication device, the password input data comprising at least a sequence of characters for initiating an emergency call. The processing unit is further enabled to, in response to receiving the sequence of characters for initiating the emergency call, control the display device to provide a representation of instructions to initiate the emergency call upon receipt of emergency call initiate data from the input device.

The processing unit can be further enabled to place the mobile communication device in an unlocked state if the password input data matches stored password data. The processing unit can be further enabled to place the mobile communication device back in the locked state after a pre-determined period of time.

The processing unit can be further enabled to receive the emergency call initiate data and initiate the emergency call.

The processing unit can be further enabled to control the display device to remove the representation of instructions to initiate the emergency call if the emergency call initiate data is not received within a given time period.

The processing unit can be further enabled to control the display device to remove the representation of instructions to initiate the emergency call if a next input in the password input data received from the input device, following the sequence of characters for initiating the emergency call, is any input other than the emergency call initiate data. The next input can comprise a character in the password input data.

The password input data can be received within a password dialog box and the representation of instructions to initiate the emergency call upon receipt of the emergency call initiate data may not obscure the password dialog box on the display device.

The input device can comprise a call send key such that the emergency call initiate data can be received via the call send key.

The input device can comprise voice recognition input device.

A third aspect of the specification provides a computer program product, comprising a computer usable medium having a computer readable program code adapted to be executed to implement a method for distinguishing between password entry and emergency call initiation at a mobile communication device comprising an input device, and a display device, the mobile communication device enabled to initiate emergency calls in a locked state. The method comprises: receiving password input data via the input device, when the mobile communication device is in the locked state, the password input data for unlocking the mobile communication device, the password input data comprising at least a sequence of characters for initiating an emergency call; and in response to receiving the sequence of characters for initiating the emergency call, controlling the display device to provide a representation of instructions to initiate the emergency call upon receipt of emergency call initiate data from the input device.

FIG. 1 depicts a system 100, including a mobile communication device 110 that can be placed in a locked state and is enabled to make emergency calls to an emergency call centre 120, according to non-limiting embodiments. Mobile communication device 110 comprises a processing unit 122, a communications interface 124, a non-volatile memory device 114, a volatile memory device 115, an input device 126 and display device 128 all in communication, for example, via a computing bus (not depicted).

In some embodiments, input device 126 can comprise a call send key 127 which, when activated, causes calls to be placed via a communications network 130, for example to emergency call centre 120. In some embodiments, call send key 127 can comprise a button/key, while in other embodiments call send key 127 can comprise a virtual button/key, which can be selected by way of a pointing device and/or touch input, in embodiments where mobile communication device 110 comprises a touch screen.

In other embodiments, input device 126 can comprise a voice recognition unit 134, such that input data can be received via voice input data, said voice recognition unit converting voice input data to input data. Hence, calls can also be initiated via voice recognition unit 134 when suitable voice input data is received.

In general, non-volatile memory 114 stores at least stored password one 131 for unlocking mobile communication device 110. For example, processing unit 122 can place mobile communication device 110 into a locked state including but not limited to, when mobile communication device 110 is turned on (e.g. upon start-up), after a given time period, when it is determined that mobile communication device 110 has been placed into a holster (e.g. the holster containing a magnet, and the mobile communication device 110 comprising a magnetic switch (not depicted) activated by the magnet), when input is received via input device 126 that mobile communication device 110 is to be locked, and the like. In any event, mobile communication device 110 can be unlocked if password input data 133, received from input device 126, comprising characters representing a password are received from input device 126, the password input data 133 matching stored password data 131.

Non-volatile memory further stores at least one emergency number 132, including but not limited to 911, 999, 112, 008, and the like. In some embodiments at least one emergency number can include, but is not limited to, character sequences representative of mapping of emergency numbers to characters on a keyboard, including but not limited to "cww", "mee", "mre", "mrr", and the like. Furthermore it is understood that the at least one emergency number 132 can be jurisdictional and/or dependent on an operator of communications network 130. It is further understood that character sequences representative of mapping of emergency numbers to characters on a keyboard can be device dependent.

Mobile communication device 110 further comprises an application 131 that can be stored in non-volatile memory 114. Application 131, upon being processed by processing unit 122, causes processing unit 122 to control mobile communication device 110, in the locked state, to provide a representation of a prompt 320 to receive an indication that mobile communication device 110 is to be unlocked via entry of password entry data and/or a password input dialog box 410, as described below with reference to FIGS. 3 and 4, respectively.

In general, mobile communication device 110 comprises any suitable computing and/or communication device for processing application 131 including but not limited to any suitable combination of laptops, mobile electronic devices, PDA's, cell phones and the like. Other suitable types of mobile electronic devices are within the scope of present embodiments.

Non-volatile memory device 114 can comprise any suitable non-volatile memory device, including but not limited to read-only memory (ROM), flash memory, magnetic computer storage devices (e.g. hard disks, floppy disks, and magnetic tape), optical discs, and the like.

Volatile memory 115 can comprise any suitable volatile memory device, including but not limited to random access memory (RAM), and the like. In general. Volatile memory device 115 is enabled to store representation data for controlling display device 128 to display representations 159 (described below).

Communications interface 124 is enabled to communicate with emergency call centre 120 via communications network 130. Accordingly, communications interface 124 is enabled to communicate via communications network 130 according to any suitable protocol which is compatible with communications network 130. Further, communications interface 124 is enabled to communicate in a wireless or wired manner, as desired, compatible with communications network 130, including but not limited to packet based protocols, Internet protocols, analog protocols, PSTN protocols, cell phone protocols (IX, UTMS, CDMA, GMS, and the like), WiFi protocols, WiMax protocols and/or a combination. Other suitable protocols are within the scope of present embodiments. Specifically, communication interface 124 is enabled to place an emergency call to emergency call centre 120 when mobile communication device 110 is in a locked state.

Similarly, communication networks 130, can comprise any suitable combination of wired and/or wireless networks, including but not limited to packet based networks, the Internet, analog networks, the PSTN, LAN, WAN, cell phone networks, WiFi networks, WiMax networks and/or a combination. Other suitable types of communication networks are within the scope of present embodiments.

Input device 126 is generally enabled to receive input data, and can comprise any suitable combination of input devices, including but not limited to a keyboard, a pointing device, a mouse, a track wheel, a touchpad, a touch screen and the like. In particular, input device 126 is enabled to receive password input data 133 comprising a sequence of characters for example via a keyboard (which can include a virtual keyboard provided at display device 128) and/or voice recognition unit 134. Input device 126 is further enabled to receive emergency call initiate data 135, for initiating an emergency call, for example via call send key 127 and/or voice recognition unit 134, such that an emergency call is initiated upon receipt of emergency call initiate data 135 at processing unit 122.

In particular, when mobile communication device 110 is in a locked state, call send key 127 can be dedicated to initiating a call to emergency call centre 120 when a sequence of characters for initiating an emergency call is received from input device 126 (e.g. "911" and the like), and call send key 127 is activated. Activation of call send key 127 is indicative of receipt of emergency call initiate data 135. Alternatively, the sequence of characters for initiating an emergency call and emergency call initiate call data 135 can be received from voice recognition unit 134.

Display module 128 comprises circuitry 158 for generating a representation 159, described below. Display module 128 can include any suitable combination of CRT and/or flat panel displays (e.g. LCD, plasma and the like), and circuitry 158 can include any suitable combination of circuitry for controlling the CRT and/or flat panel displays etc., including but not limited to display buffers, transistors, electron beam controllers, LCD cells, plasmas cells, phosphors etc. In particular, display module 128 and circuitry 158 can be controlled by processing unit 122 to generate representations 159, 165.

Figure 2:
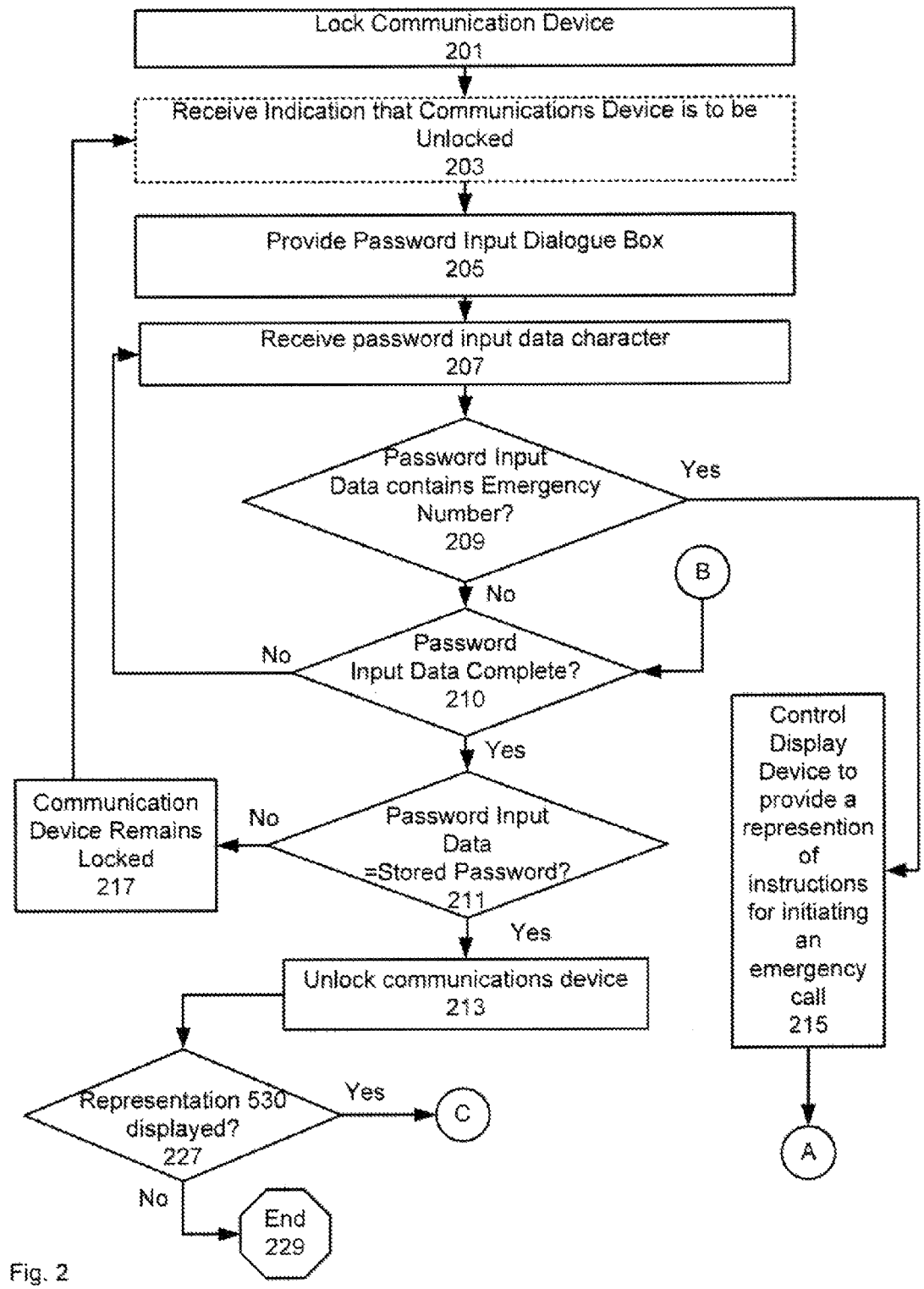
FIG. 2 depicts a schematic diagram of a method for unlocking a mobile communication device, according to non-limiting embodiments.

Attention is now directed to FIG. 2 which depicts a method 200 for unlocking a mobile communication device. In order to assist in the explanation of the method 200, it will be assumed that the method 200 is performed using system 100, and specifically mobile communication device 110. Furthermore, the following discussion of the method 200 will lead to a further understanding of system 100, and its various components including but not limited to mobile communication device 110. However, it is to be understood that system 100 and/or method 200 can be varied, and need not work exactly as discussed herein in conjunction with each other, and that such variations are within the scope of present embodiments.

At 201, mobile communication device 110 is placed in a locked state.

Figure 3:
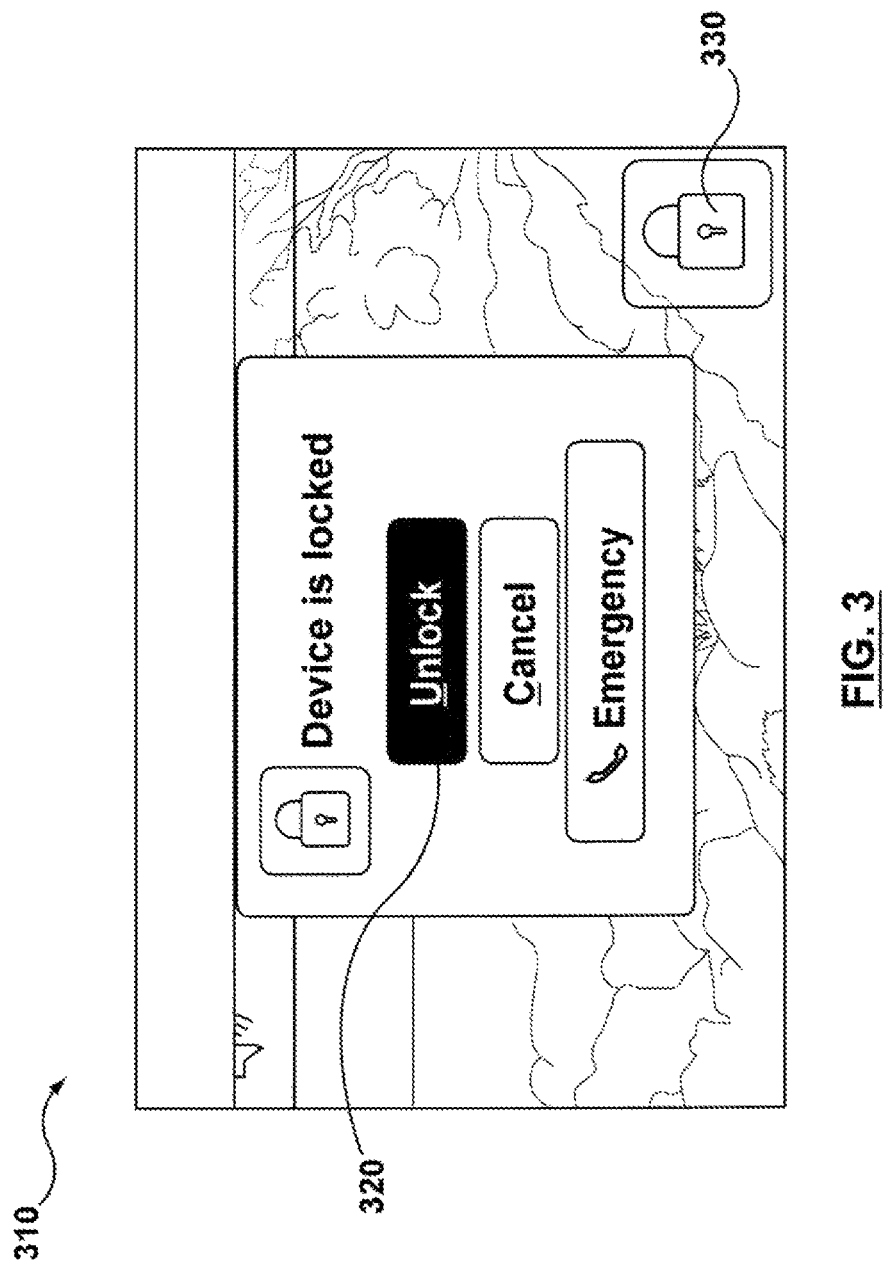
FIG. 3 depicts a representation of a dialog box including a prompt to unlock the mobile computing device of FIG. 1, according to non-limiting embodiments.

In some embodiments, at 203 (optional), an indication is received that mobile communication device 110 is to be unlocked. For example, processing unit 122 controls display device 128 (for example via control of circuitry 158), to provide a representation 310, as depicted in FIG. 3, according to non-limiting embodiments. Representation 159 can comprise representation 310. In any event, representation 310 comprises at least a prompt 320 to receive an indication that mobile communication device 110 is to be unlocked via entry of password entry data. Representation 159 can further comprise an icon 330 indicative that mobile communication device 110 is in a locked state. In some embodiments, processing unit 122 can control display device 128 to provide representation 330 upon receipt of any suitable input data at input device 126. In some embodiments, the any suitable input data can comprise an indication that any suitable button at mobile communication device 110 has been activated. In any event, in these embodiments, prompt 320 can be selected, for example via a pointing device.

Figure 4:
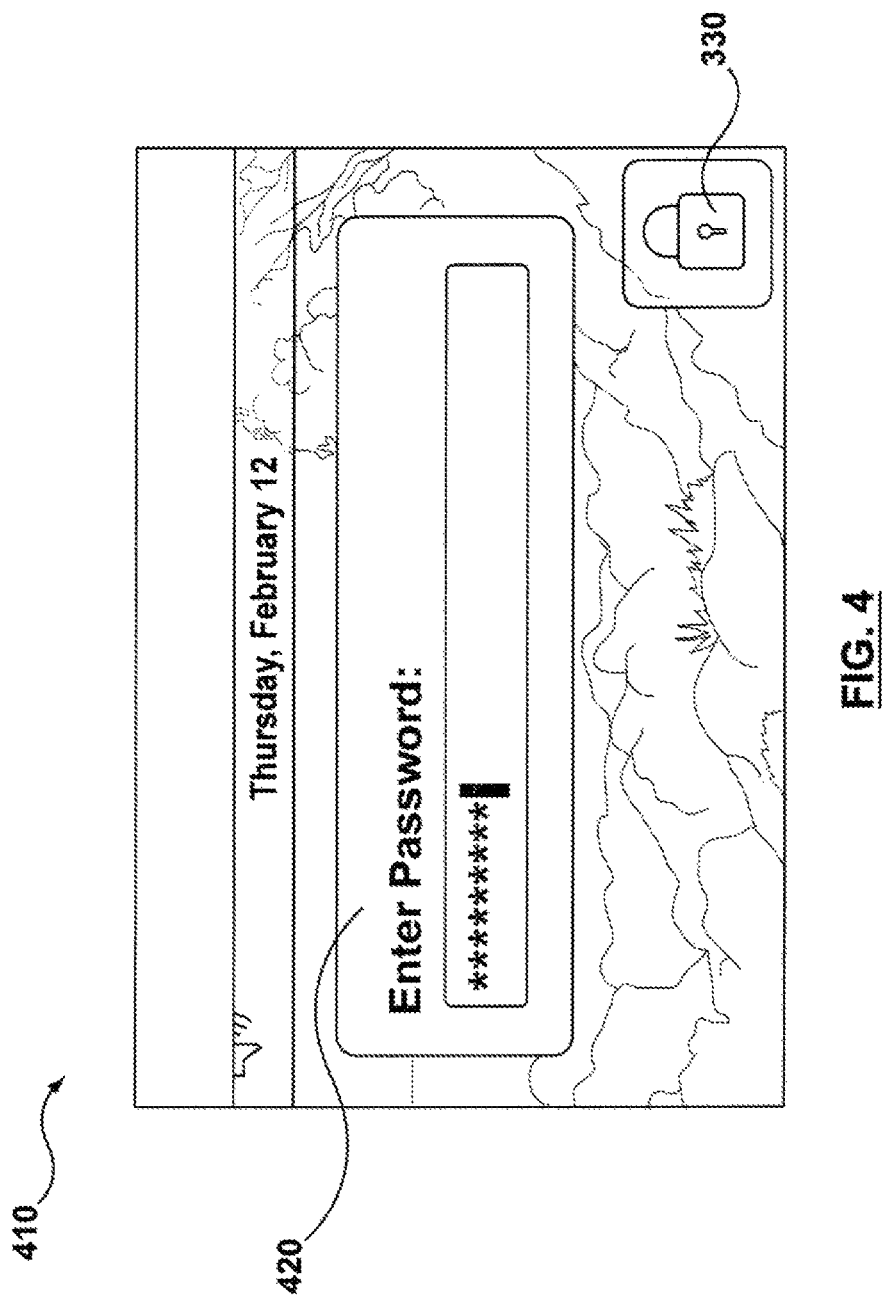
FIG. 4 depicts a representation of a dialog box including a prompt for a password to unlock the mobile computing device of FIG. 1, according to non-limiting embodiments.

At 205, a password input dialog box 410 is provided, for example as depicted in representation 420 in FIG. 4, according to non-limiting embodiments. FIG. 4 is similar to FIG. 3, with like elements having like numbers. Furthermore representation 159 can comprise representation 420. In general, processing unit 122 controls display device 128 to provide representation 420, for example upon activation of prompt 320. In other embodiments, processing unit 122 controls display device 128 to provide representation 420 upon receipt of first password input data 133, from input device 126. In other words, when mobile communication device 110 is in a locked state, and input data comprising a first character in a password is received, processing unit 122 controls display device 128 to provide representation 420, and specifically password input dialog box 410.

At 207, a password input data 133 character is received via input device 126, for example a first character in stored password data 131. In some embodiments, 207 can occur in parallel with 205, in that receipt of first password input data 133 can cause processing unit 122 to control display device 128 to provide representation 420, as has been described above. However, it is further noted that 207 can be repeated any suitable number of times, as will be described below, until all of password input data 133 is received: further, for each character in password input data 133 received, a symbol such as an asterisk and the like, is provided in password dialog box 410, to indicate the number of characters in password input data 133 that have been received, as well as to hide details of the password input data 133, for security purposes.

At 209, processing unit 122 compares at least one emergency number 132 to the password input data 133 to determine if password input data 133 contains at least one emergency number 132. In present embodiments, the comparison occurs after receipt of each password input data 133 character. For example, if password input data 133 comprises "dHk911ui", each character received in order, and at least one emergency number 133 comprises "911", then when the characters received comprises "dHk911". It is determined that password input data 133 comprises at least one emergency number 132.

Figure 5:
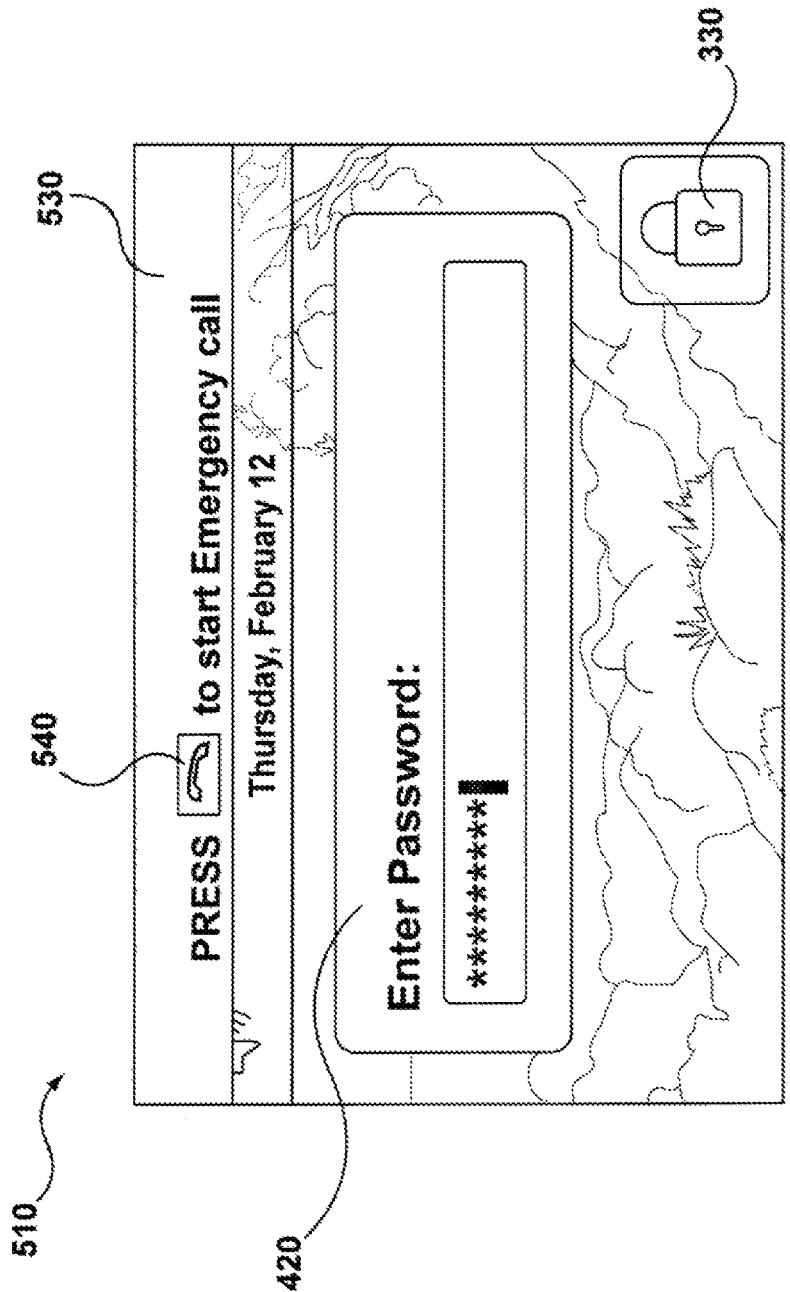
FIG. 5 depicts a representation of instructions to initiate an emergency call upon receipt of input from a call send key, according to non-limiting embodiments.

If so, then at 215 processing unit 122 controls display device 128 to provide a representation 520, comprising a representation 530 of instructions to initiate an emergency call upon receipt of emergency call initiate data 135. Representation 520 is depicted in FIG. 5, according to non-limiting embodiments, FIG. 5 being substantially similar to FIG. 4, with like elements having like numbers. In these embodiments, representation 530 comprises an icon 540 representative of call send button 127, and the text "Press (icon 540) to Start Emergency Call". Furthermore, representation 530 is provided in an area of representation 520 that does not obscure or interfere with password dialog box 410. Neither is an emergency call dialog box provided, nor is an emergency call initiated.

Figure 6:
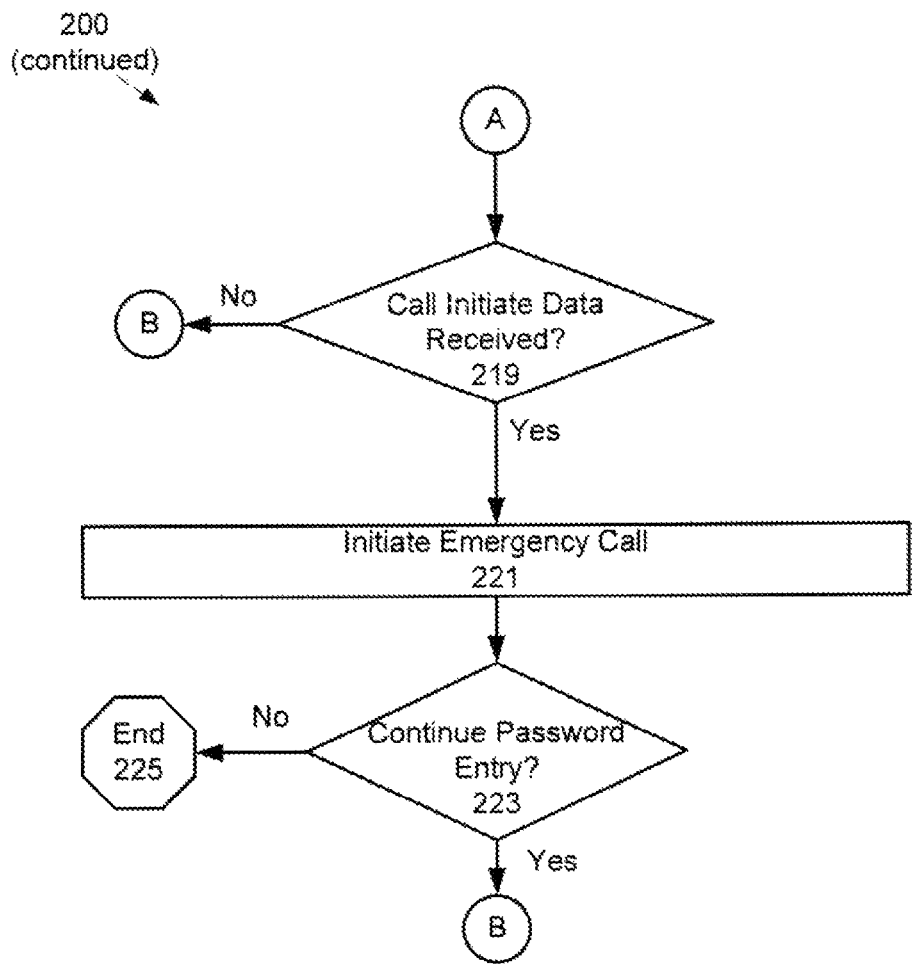
FIG. 6 depicts further steps in the method of FIG. 2, according to non-limiting embodiments.

FIG. 6 depicts further elements in method 200, which continues at A. It is understood that after 215, at 219 it is determined if emergency call initiate data 135 has been received (e.g. via call send key 127 and/or voice recognition unit 134). If so, an emergency call to emergency call centre 120 is initiated at 221. Hence, the emergency call occurs and mobile electronic device 110 remains locked. In some of these embodiments, however, it is then determined at 223 if password entry is to continue. If so, then 210 occurs, described below. In these embodiments, the emergency call can occur and mobile communication device 110 can be unlocked. The determination at 223 can be made if the emergency call is made and display device 128 is controlled to provide a representation (not depicted) inquiring as to whether or not password entry is to continue, along with "yes/no" buttons. If a positive response is received, then 210 occurs (from "B"). Otherwise method 200 ends at 225 and mobile electronic device 110 remains locked.

It is furthermore understood that if emergency call initiate data 135 is not received within a given time period (for example 10 seconds, or any other suitable length of time) at 219, processing unit 122 controls display device 128 to remove representation 530. In addition, if emergency call initiate data 135 is not received at 219, 210 occurs (from "B").

Returning to FIG. 2, whether or not the password input data contains an emergency number, 210 is performed in which processing unit determines if password input data 133 is complete such that password input data 133 is to be compared with stored password data 131. For example, in some embodiments, such a determination can be made if input data indicating that a return key (not depicted) has been pressed, a press of the return key indicating that password input data is complete. Alternatively, data indicating that password input data is complete can be received from voice recognition unit 124. If password input data 133 is not yet complete, then further characters in password input data 133 can be received at 207.

In some embodiments, if 209 and 215 have already occurred, then they are not repeated upon receipt of further characters in password input data 133, when 207 is repeated. Furthermore, if 209 and 215 have occurred, and a next input from input device 126 is any input other than emergency call initiate data 134, then processing unit 122 controls display device 122 to remove representation 530. For example, a next input can comprise a character in password input data received at 207.

In any event, if password input data 133 is complete, password input data 133 can then be compared with stored password data 131 by processing unit 122, at 211. If password input data 133 matches the stored password data 131 then, at 213, mobile communication device 110 is placed in an unlocked state, otherwise mobile communication device 110 remains in a locked state, as indicated at 217. In some embodiments, 203 through 215 can be repeated.

Figure 7:
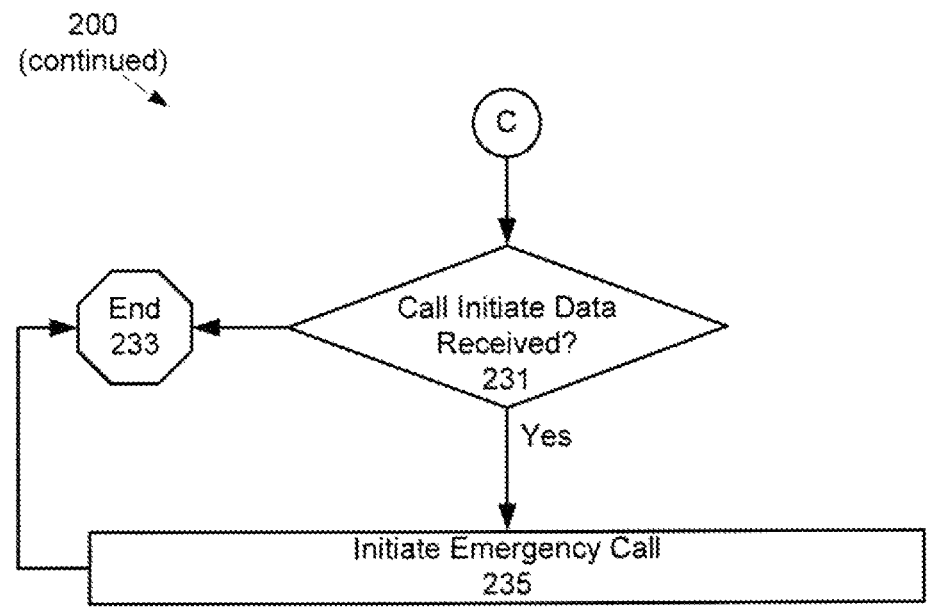
FIG. 7 depicts further steps in the method of FIG. 2, according to non-limiting embodiments.

In some embodiments, after 213, method 200 continues at optional 227, where it is determined if representation 530 is still being provided at display device 128 (i.e. step 213 has occurred, but an emergency call has not been initiated). If not, then method 200 ends at 229. Otherwise, method 200 continues at "C", as depicted in FIG. 7, where it is determined at 231 if emergency call initiate data is received (similar to 219). If not (e.g. after a period of time), then method 200 ends at 233. If so, then an emergency call is initiated at 235 (similar to 221). Hence, in these embodiments, mobile communication device 110 is unlocked and the emergency call is initiated.

As used in this application, making an emergency call that results in mobile communication device 110 being unlocked includes different levels of unlocking. For example, mobile communication device 110 can be unlocked only to the amount and level of functionality needed to make emergency calls, and for all other functionality remains locked, or unavailable. Alternatively, mobile communication device 110 can be unlocked for its phone application only (full phone functionality), but no others. In these cases, mobile communication device 110 can be configured to stay in this limited unlocked state, where call can be made or received at mobile communication device 110 (but no other functions can be used, nor can any stored information be accessed) for a duration of time after the emergency call has been completed. For example, a duration of time after the emergency call has been completed could be set in increments of any suitable time period, e.g. 5, 10, or 30 minute increments. Such a duration can be configurable at mobile communication device 110.

Alternatively, mobile communication device 110 can be unlocked as an accepted password in addition to an emergency call being initiated, and can stay fully unlocked after the completion of the emergency call. The duration of the unlocked state can vary. For example, the implemented unlocked state can last as long as the emergency phone call is active plus a set amount of time after the call is completed, which allows incoming calls in response to the emergency call to be received. Alternatively, if the unlocked state corresponds to unlocking the phone application on mobile communication device 110, mobile communication device 110 can stay in that form of unlocked state indefinitely. Alternatively, mobile communication device 110 can enter and stay in a fully unlocked state (e.g. all applications available) upon acceptance of an emergency call, but revert to a locked state after a designated amount of time has passed. In other words method 200 can further comprise placing mobile communication device (110) back in the locked state after a pre-determined period of time. These varying locking levels and time in those locking levels can be designed into mobile communication device 110 by the manufacturer, can be selectable by the device's owner when different from a user of mobile communication device 110, can be selectable in part by the carrier (to minimize abuse, for example), or can be selectable in whole or in part by user of mobile communication device 110.

In any event, by providing instructions to provide emergency call input data to initiate an emergency call, if a password contains an emergency number sequence, the password input process is not interrupted to either initiate an emergency call and/or require input to confirm that an emergency call is not to be made. Hence passwords containing an emergency number sequence become more practical, and further system resources are conserved by prevention of placing a communication device in an emergency call ready mode and/or provide the emergency call dialog box and/or cause an erroneous emergency call to be placed. This can further conserve bandwidth, saves resources at an emergency call centre, and enables legitimate emergency calls to be processed more efficiently at the emergency call centre.

Those skilled in the art will appreciate that in some embodiments, the functionality of mobile communication device 110 can be implemented using pre-programmed hardware or firmware elements (e.g., application specific integrated circuits (ASICs), electrically erasable programmable read-only memories (EEPROMs), etc.), or other related components. In other embodiments, the functionality of mobile communication device 110 can be achieved using a computing apparatus that has access to a code memory (not shown) which stores computer-readable program code for operation of the computing apparatus. The computer-readable program code could be stored on a computer readable storage medium which is fixed, tangible and readable directly by these components, (e.g., removable diskette, CD-ROM, ROM, fixed disk, USB drive). Alternatively, the computer-readable program code could be stored remotely but transmittable to these components via a modem or other interface device connected to a network (including, without limitation, the Internet) over a transmission medium. The transmission medium can be either a non-wireless medium (e.g., optical and/or digital and/or analog communications lines) or a wireless medium (e.g., microwave, infrared, free-space optical or other transmission schemes) or a combination thereof.

A portion of the disclosure of this patent document contains material which is subject to copyright protection. The copyright owner has no objection to the facsimile reproduction by any one the patent document or patent disclosure, as it appears in the Patent and Trademark Office patent file or records, but'otherwise reserves all copyrights whatsoever.

Persons skilled in the art will appreciate that there are yet more alternative implementations and modifications possible for implementing the embodiments, and that the above implementations and examples are only illustrations of one or more embodiments. The scope, therefore, is only to be limited by the claims appended hereto.

What is claimed is:

1. A method comprising:
   in response to receiving a sequence of characters in password input data at a mobile device in a locked state, the sequence of characters also recognized for initiating an emergency call, providing instructions, at a display of the mobile device, to initiate the emergency call upon receipt of emergency call initiate data; and
   removing the instructions at the display and cancelling instruction to initiate said emergency call when:
   a next input in the password input, following the sequence of characters, comprises a character in the password input data and is any input other than the emergency call initiate data.

2. The method of claim 1, further comprising placing the mobile device in an unlocked state when the password input data matches stored password data.

3. The method of claim 2, further comprising placing the mobile device back in the locked state after a pre-determined period of time.

4. The method of claim 1, further comprising receiving the emergency call initiate data and initiating the emergency call.

5. The method of claim 1, wherein the password input data is received within a password dialog box and the representation of instructions to initiate the emergency call upon receipt of the emergency call initiate data does not obscure the password dialog box on the display device.

6. The method of claim 1, wherein the mobile device comprises a call send key such that the emergency call initiate data can be received via the call send key.

7. The method of claim 1, wherein the password input data is received via an input device.

8. The method of claim 1, wherein the password input data is received via a voice recognition input device.

9. A mobile device configured for access when in a locked state, comprising:
   a processor and a display, the processor enabled to:
   in response to receiving a sequence of characters in password input data at the mobile device in the locked state, the sequence of characters also recognized for initiating an emergency call when the mobile device is in a locked state, provide instructions at the display to initiate the emergency call upon receipt of emergency call initiate data; and
   remove the instructions at the display and cancelling instruction to initiate said emergency call when:
   a next input in the password input, following the sequence of characters, comprises a character in the password input data and is any input other than the emergency call initiate data.

10. The mobile device of claim 9, wherein the processor is further enabled to place the mobile device in an unlocked state when the password input data matches stored password data.

11. The mobile device of claim 9, wherein the processor is further enabled to place the mobile device back in the locked state after a pre-determined period of time.

12. The mobile device of claim 9, wherein the processor is further enabled to receive the emergency call initiate data and initiate the emergency call.

13. The mobile device of claim 9, wherein the password input data is received within a password dialog box and the representation of instructions to initiate the emergency call upon receipt of the emergency call initiate data does not obscure the password dialog box on the display device.

14. The mobile device of claim 9, further comprising a call send key such that the emergency call initiate data can be received via the call send key.

15. The mobile device of claim 9, further comprising an input device, wherein the password input data is received via the input device.

16. The mobile device of claim 9, further comprising a voice recognition input device, wherein the password input data is received via the voice recognition input device.

17. A non-transitory computer readable medium having a computer readable program code adapted to be executed by a processor to implement a method comprising:
   in response to receiving a sequence of characters in password input data at a mobile device in a locked state, the sequence of characters also recognized for initiating an emergency call, providing instructions, at a display of the mobile device, to initiate the emergency call upon receipt of emergency call initiate data; and
   removing the instructions at the display and cancelling instruction to initiate said emergency call when:
   a next input in the password input, following the sequence of characters, comprises a character in the password input data and is any input other than the emergency call initiate data.

* * * * *